March 16, 1926.
W. J. QUIRK
ELECTRIC BATTERY
Filed March 23, 1925
1,576,786
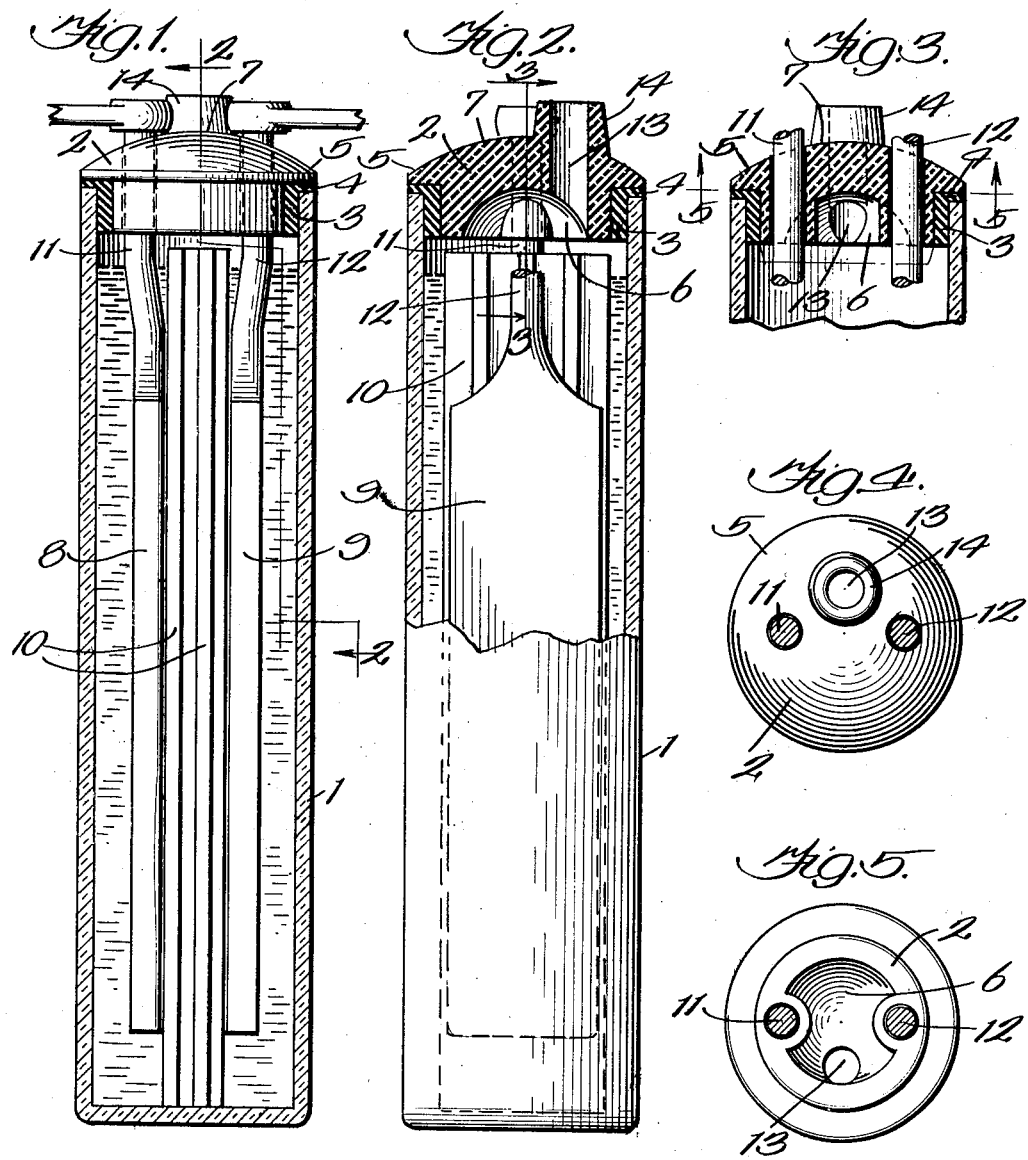
Inventor:
Wellington J. Quirk
By G. L. Cragg
Atty.

Patented Mar. 16, 1926.

1,576,786

UNITED STATES PATENT OFFICE.

WELLINGTON J. QUIRK, OF CHICAGO, ILLINOIS.

ELECTRIC BATTERY.

Application filed March 23, 1925. Serial No. 17,635.

*To all whom it may concern:*

Be it known that I, WELLINGTON J. QUIRK, a citizen of the United States, residing at Chicago, in the county of Cook and the State of Illinois, have invented a certain new and useful Improvement in Electric Batteries, of which the following is a full, clear, concise, and exact description.

My invention relates to electric batteries and is of particular service in connection with B batteries employed in systems of radio communication though the invention is not to be limited to any particular use.

My invention has for its particular object the provision of means for preventing the accumulation of short circuiting liquid or moisture upon the covers of battery jars through which the battery electrodes extend.

In carrying out my invention the top sides of the battery jar covers are convex so that any moisture or liquid accumulating thereon will readily fall from the portions of the covers between the electrodes to a sufficient extent to break any electrical connection that the fluid upon the covers might otherwise tend to establish between the electrodes.

In accordance with common practice vent openings are provided through the covers of battery jars and these vent openings have hitherto tended to conduct moisture or fluid from the interior of the battery jars to the top surfaces of the covers where the same would be apt to flow between the portions of the electrodes extending through the covers and establish short circuiting connection between the electrodes.

I continue the covers of the battery jars at the vent openings above the surrounding parts of the covers to check the tendency of any moisture to creep through the jar covers, and if any such moisture should creep through the jar covers it will be directed by the convex tops of the covers out of short circuiting relation with the electrodes. I further guard against the tendency of fluid to rise through the vent openings by making the bottom sides of the jar covers concave, the vent openings communicating with the interiors of the jars through the cavities in the bottom sides of the covers.

The invention will be more fully explained in connection with the accompanying drawing in which Fig. 1 is a vertical sectional view of a battery jar with the cover, the electrodes, and the separator shown in elevation; Fig. 2 is a sectional view on line 2—2 of Fig. 1; Fig. 3 is a view of the upper part of the structure on line 3—3 of Fig. 2; Fig. 4 is a plan view showing the battery and electrode continuations in section; and Fig. 5 is a sectional view on line 5—5 of Fig. 3.

It is common to make each jar 1 of a B battery of glass and to provide it with a cover 2 formed of porcelain and received in a sealing gasket 3, which, in turn, is received in the jar and is provided with a flange 4 that rests upon the top of the jar. The cover 2 has a body portion which is surrounded by the gasket and a flange 5 which is seated upon the top of the gasket and the gasket flange 4. I form the bottom side of the cover with a cavity 6 and make the top side of the cover convex as indicated at 7. The upper electrodes 8 and 9 are usually upon the opposite sides of the axis of the jar and are separated by a separator 10 that is on the axis of the jar. The electrodes are slightly diverging at their upper ends 11 and 12 which pass upwardly through the jar cover on opposite sides of the cavity 6 and on opposite sides of the highest point of the convex top surface 7. The vent 13 extends through the cover and communicates with the interior of the jar through the cavity 6 at which the vent commences. The cover has a hollow continuation 14 whose interior is a continuation or a part of the vent. This continuation 14 is desirably located between the axis of the jar and its cover and the cover flange 5. The cavity 6 makes it difficult for moisture to reach the vent 13 but if the moisture should reach this vent the height of the vent by reason of the cover continuation 14, makes it difficult for the moisture to reach the top of the cover. If the moisture should reach the top of the cover and succeed in falling downwardly on the outside of the cover continuation 14 the convex top surface of the cover would direct the moisture from any short circuiting relation it might otherwise have with the electrodes where they continue through the cover.

Having thus described my invention, I claim:

1. An electric battery including a jar, a cover for the jar, battery electrodes extending through the cover from the interior of the jar to the exterior of the battery said cover having a vent formed therethrough and being continued at the vent above the top side of the cover, the cover having a cavity in its bottom side between the electrodes and at which the vent commences.

2. An electric battery including a jar, a cover for the jar, battery electrodes extending through the cover from the interior of the jar to the exterior of the battery said cover having a vent formed therethrough and being continued at the vent above the top side of the cover which is convex, the cover having a cavity in its bottom side between the electrodes and at which the vent commences.

3. An electric battery including a jar, a cover for the jar, battery electrodes extending through the cover from the interior of the jar to the exterior of the battery, said cover having a vent opening and having its top surface convex, the vent opening leading to this surface, the cover having a cavity in its bottom side between the electrodes and at which the vent commences.

In witness whereof, I hereunto subscribe my name.

WELLINGTON J. QUIRK.